United States Patent [19]

Berry et al.

[11] 4,308,537
[45] Dec. 29, 1981

[54] AUTOMATIC RANGE CONTAINMENT SYSTEM

[75] Inventors: Clyde R. Berry; Richard A. Dye, both of Santa Barbara, Calif.

[73] Assignee: The United States of America as represented by the Secretary of the Army, Washington, D.C.

[21] Appl. No.: 153,467

[22] Filed: May 27, 1980

[51] Int. Cl.$^3$ .......................... G01S 13/70; G01S 17/66
[52] U.S. Cl. ........................................... 343/7.3; 356/5
[58] Field of Search .............................. 343/7.3; 356/5

[56] References Cited

U.S. PATENT DOCUMENTS 3,666,367  5/1972  Farnsworth et al. ............ 343/7.3 X
3,900,261  8/1975  Wingate .................................... 356/5
4,117,482  9/1978  Jepsky et al. ........................ 343/7.3

*Primary Examiner*—Malcolm F. Hubler
*Attorney, Agent, or Firm*—Nathan Edelberg; Robert P. Gibson; Max Yarmovsky

[57] ABSTRACT

The present invention discloses an automatic range containment system for use in an electric/optical or electromagnetic active "radar" type sensor to discriminate against background obstructions within a sensor field of view. The system comprises an intrusion timer initiated by a signal received from a target sensor; a containment interval timer initiated by a turn-on pulse; a transmitter oscillator in combination with a clock generating pulses; a range containment timer initiated by the pulses; a range set-back timer in combination with a range gate and a gate; a range counter for counting and totalling a signal passed through the gate; and a digital-to-analog converter converting the signal from the range counter to the range containment timer providing a range control causing the system to reduce operational range if the background obstructions appear within the sensor's field of view.

3 Claims, 1 Drawing Figure

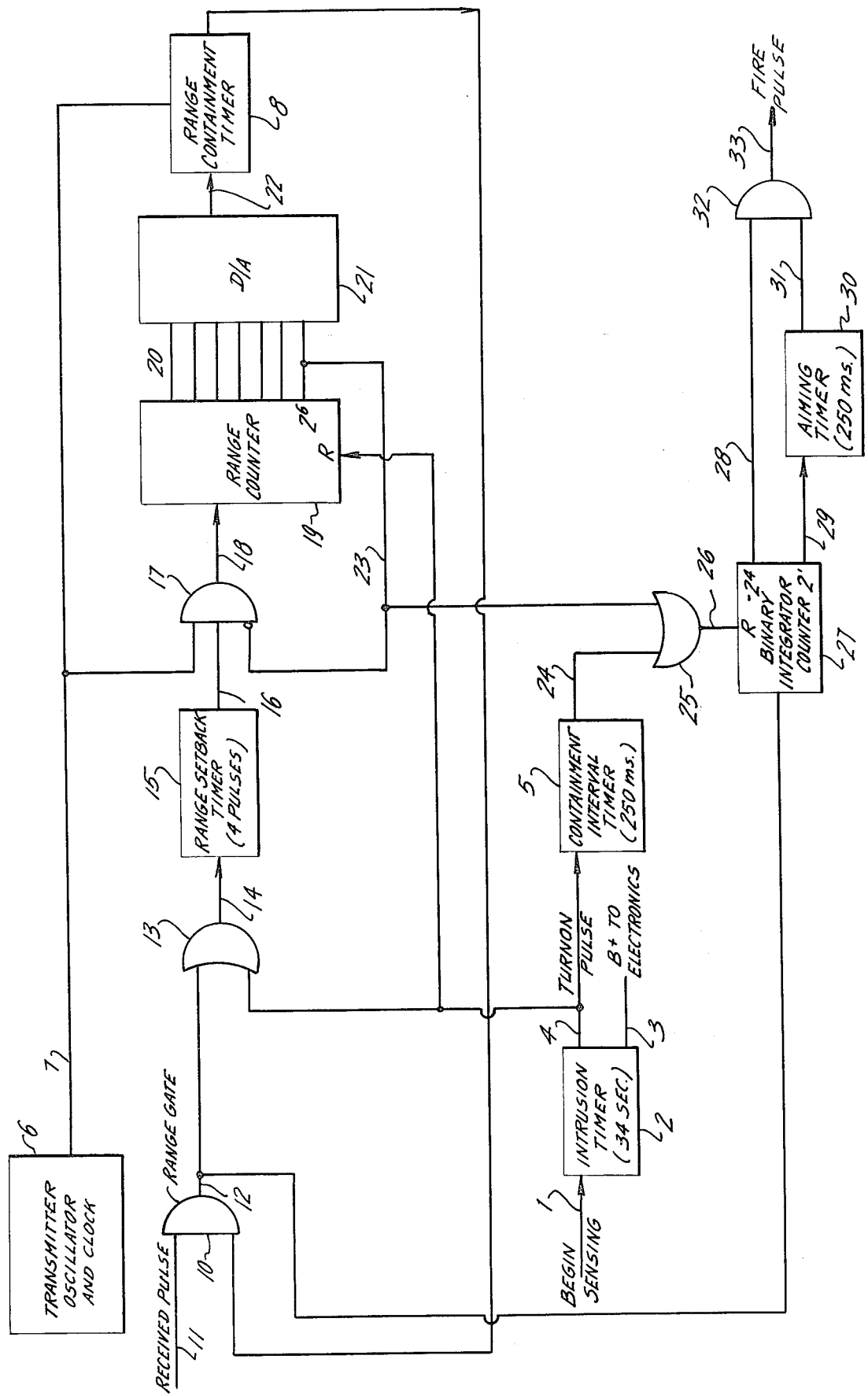

AUTOMATIC RANGE CONTAINMENT SYSTEM

GOVERNMENTAL INTEREST

The invention described herein was made in the course of a contract with the Government and may be manufactured, used and licensed by or for the Government for Governmental purposes without the payment to us of any royalties thereon.

BACKGROUND OF THE INVENTION

The present invention relates to a field of the art dealing with an automatic range containment system for use in radar type sensor to discriminate against background obstructions within a sensor field of view.

The basic shortcoming in prior art devices has related to an absence of a device that can discriminate against background obstructions with respect to the prospective target within the sensor field of view. That is, in order to assure accuracy of the device, it is essential that a median speed target is hit directly in its center.

Efforts in the prior art in solving the above problems have been further encumbered by the fact that the background obstructions frequently vary in size and color and it is very difficult to detect the actual target surrounded by said obstructions. The automatic range containment system of the present invention provides an automatic fool-proof method of discriminating against background obstructions within the sensor field of view. This problem has, in the prior art, proven to be a formidable one. Accordingly, the present invention is intended as a solution to said problem.

SUMMARY OF THE INVENTION

The present invention discloses an automatic range containment system for use in an electro/optical or electromagnetic active "radar" type sensor to discriminate against background obstructions within a sensor field of view. A range containment timer is provided within whose time interval received target pulses are allowed to be totalled in a range counter. The length of the interval limits the maximum detected range since pulses at greater ranges arrive at the sensor at a later time due to propagation delay associated with the greater range, and therefore fall outside of a range gate. The system comprises an intrusion timer initiated by a turn-on pulse; a transmitter oscillator in combination with a clock generating pulses; a range containment timer initiated by said pulses; a range set back timer in combination with a range gate and a gate; a range counter for counting and totalling a signal passed through the gate; and a digital-to-analog converter converting the signal from the ranger counter to the range containment timer providing a range control causing the system to reduce operational range if the background obstructions appear within the sensor's field of view. The range containment timer interval is adjustable and is shortened by the value of the count present in the range counter. The range containment timer interval starts at an equivalent maximum range and automatically reduces if an obstacle is in the beam and within this range at turn-on.

It is an object of the present invention to provide an automatic range containment system capable of discriminating against background obstructions with respect to a moving legitimate target within the sensor field of view.

It is another object of the present invention to provide a system that will automatically detect and ignore obstructions within its field of view and maximum range that would normally render a sensing technique ineffective.

It is a further object of the present invention to provide an extremely accurate and reliable automatic range containment system.

BRIEF DESCRIPTION OF THE DRAWING

The drawing is a block diagram of an automatic range containment system.

DETAILED DESCRIPTION OF THE INVENTION

A general understanding of the present invention may be obtained with reference to the drawing.

An alert from a secondary sensor is received and a primary sensor (not shown) begins sensing. This signal 1 triggers an intrusion timer 2 whose duration (preferably 34 seconds) determines the time that the sensor is on and completes a connection 3 providing power to the system. At turn-on, a turn-on pulse 4 is generated which initiates a containment interval timer 5, during whose on-time the system detection range is reduced to a value less than the range of any non-target obstacles which appear in the sensor field of view at turn-on. Turn-on pulse 4 also resets range counter 19, but does not hold it in reset.

As laser pulsing is initiated (laser not shown), transmitter oscillator and transmitter clock 6 produces pulses 7 of which each pulse initiates a range containment timer 8 during whose "on" time it serves to pass, through range gate 10, the transmitter's reflected, received pulses 11. The range-gated, reflected, received pulses 12 pass through gate 13 as signal 14 and initiate the range setback timer 15. This range setback timer's "on" interval has a duration equal to the time between four of the transmitted pulse periods. The timer 15 is also re-triggerable; i.e., its output 16 will be high (timer-on) for four pulse periods after the last initiating pulse at 14. The timer 15 is also initiated at sensor turn-on by signal 4.

While timer 15 is "on", transmitter pulses 7 pass through gate 17 as signals 18 are counted and totalled by range counter 19. The binary count of the range counter 19 as signals 20 is converted to an analog voltage by the digital-to-analog converter 21 and this signal 22 is applied to the range containment timer 8 to provide range control and this signal reduces the "on" time of the range-gating signal 9. Therefore, as the transmitter oscillator continues to generate pulses, the range containment timer 8 continues to reduce the time interval in which received pulses are allowed to pass through the range gate 10. This, in effect, causes the system to reduce its operational range if an obstruction is within the sensor's field-of-view at turn-on. As the timer interval continues to reduce, eventually no received pulses will occur due to the time interval being less than the equivalent time for a transmitted pulse to be reflected from the obstacle.

When four received pulses (equivalent to approximately 8 feet) are missed in the range setback timer 15, the signal 16 falls and gate 17 prevents the range counter 19 from being further incremented by the transmitter clock pulses 7, and prohibits any further reduction in the sensor's operational range. The range containment timer 8 starts at an equivalent range of approximately 105 feet and automatically reduces if an obstacle is in the beam and within this range at turn-on. The interval then reduces so that it remains set at 8 feet less range than the range to the obstacle. If no obstacle is in the beam, the turn-on pulse 4 initiates the range setback timer 15 which sets-back to range for pulses (or 8 feet) from the maximum range of 105 feet to arrive at the operational range of 97 feet. If an obstacle is at less than a 20 foot range, the interval reduces to this value and then inactivates the sensor completely via the maximum count signal 23 from range counter 19 which passes through gate 25 as signal 26 to hold the binary integrator counter 27 in reset, prohibiting it from counting.

Approximately after 250 ms of the sensor turn-on, a time greater than that needed for the sensor to become "range contained" and its detection range set up to be less than any interposing obstacle, the containment interval timer 5 times out and ceases holding the binary integrator counter 27 in reset (through signal 24, gate 25 and signal 26). If a target then passes through the sensor field-of-view during the rest of the 34 second inrusion timer 2 interval target reflected pulses will be received through chain 11, 10 and 12 and will be counted by the binary integrator counter 27. When the binary integrator counter's 27 count goes to predetermined value, preferably 16, i.e., ($2^4$), a fire pulse signal is generated on line 28 to trigger the munition and destroy the target. This signal 28 is delayed and gated in gate 32 by the interval of the aiming timer 30 via signal 29 and 31 which serves to delay the fire pulse 33 so that a median speed target, for example a target of 25 miles-per-hour and 18 feet wide, is hit directly in its center.

Accordingly, while there have been shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

What is claimed is:

1. An automatic range containment system discriminating against background obstructions within a sensor field of view, which comprises:
    (a) means for receiving a signal from a target sensor, for completing a connection providing power to said system, and for generating a turn-on pulse;
    (b) a containment interval timer electrically coupled to said intrusion timer and initiated by the turn-on pulse, said interval timer having an on-time adapted to enable said system detection range to be reduced to a value less than the range of a non-target obstacles appearing in the sensor's field-of-view;
    (c) a transmitter oscillator in combination with clock-generating pulses;
    (d) a range containment timer electrically coupled to said transmitter oscillator and initiated by said pulses;
    (e) a range gate electrically connected to a first gate and a range setback timer initiated by range-gated, reflected pulses from said transmitter oscillator, in which said range setback timer is also initiated at said turn-on pulse;
    (f) a range counter electrically coupled to a second gate for counting and totalling a signal passed through said second gate;
    (g) a digital-to-anaolg converter coupled to the output of said range counter for converting the signals from the range counter to said range containment timer and providing a range control causing the system to reduce operational range if background obstructions appear within the sensor's field of view.

2. The automatic range containment system as recited in claim 1 further comprises:
    (a) a binary integrator counter electrically connected to said range counter through a third gate receiving a maximum count signal from said range counter; and
    (b) an aiming timer in combination with a fourth gate connected across said binary integrator counter so that when a count by said binary integrator counter reaches a predetermind value, a fire pulse signal is generated, and said signal is delayed and gated in said gate by an interval of said aiming timer which serves to delay the fire pulses in order to hit a median speed target directly in its center.

3. An automatic range containment system as recited in claim 1 or 2 wherein said means for receiving a signal from a target sensor comprises; an intrusion timer having a duration of on time of 34 seconds; a first output pulse signal for generating a turn-on pulse to the input of said containment interval time, to initiate reset for said range counter and to supply an input signal for said first gate.

* * * * *